Figure 1:
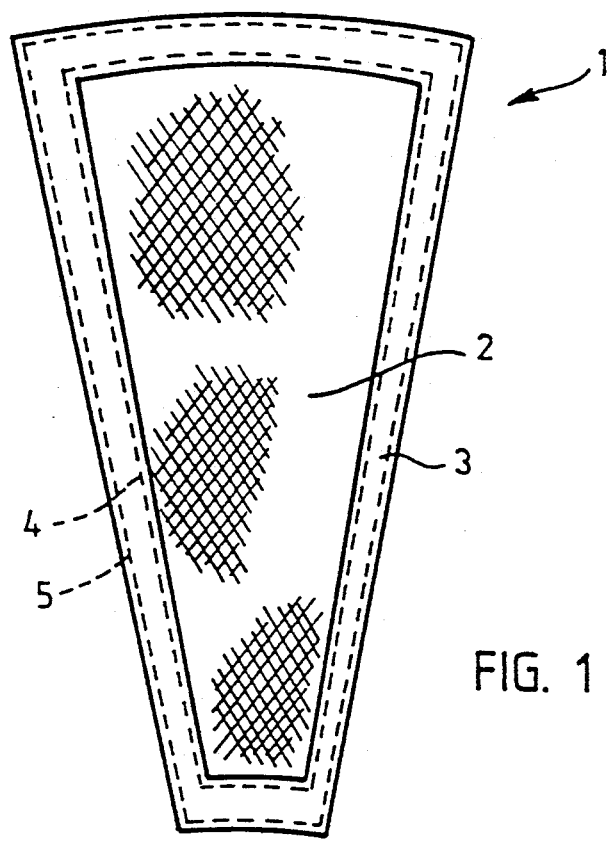

United States Patent [19]

Perälä et al.

[11] Patent Number: 5,084,174
[45] Date of Patent: Jan. 28, 1992

[54] FILTER BAG FOR A MACHINE SCREEN

[75] Inventors: Aulis Perälä, Teräksentie; Matti Servo, Saunamäenkatu; Ilkka Alatalo, Variksenmarjantie, all of Finland

[73] Assignee: Tamfelt Oy AB, Tampere, Finland

[21] Appl. No.: 601,642

[22] Filed: Oct. 23, 1990

[51] Int. Cl.⁵ .......................................... B01D 29/11
[52] U.S. Cl. ........................... 210/331; 210/346; 210/486; 55/369
[58] Field of Search ............ 210/331, 346, 486, 487, 210/494.3; 55/361, 367, 369, 379

[56] References Cited

U.S. PATENT DOCUMENTS

| | | | |
|---|---|---|---|
| 2,338,549 | 1/1944 | Shriver et al. | 210/486 |
| 2,691,445 | 10/1954 | Eickemeyer | 210/346 |
| 2,964,194 | 12/1960 | Oliver, Jr. et al. | 210/486 |
| 3,339,742 | 9/1967 | Kracklauer | 210/486 |
| 3,369,668 | 2/1968 | Glos, II | 210/486 |
| 4,022,695 | 5/1977 | Howard et al. | 210/346 |
| 4,923,605 | 5/1990 | Nilsson | 210/486 |

Primary Examiner—Robert A. Dawson
Assistant Examiner—Wanda L. Millard
Attorney, Agent, or Firm—Lowe, Price, LeBlanc & Becker

[57] ABSTRACT

A filter bag (1) for a disc-like filter, comprising filter surfaces (2) to be positioned on both sides of a filter element. The filter element is inserted into the filter bag, and the filter bag is heated so that the heated portion shrinks, thus tightening the filter bag around the filter element. The filter bag (1) is so shaped that the filter parts (2) to be positioned on both sides of the filter element are substantially of the same shape and size as the required filter surfaces. An edge part (3) of a material substantially impermeable to liquid and shrinkable at elevated temperature is attached to the edges of the filter parts.

11 Claims, 1 Drawing Sheet

FILTER BAG FOR A MACHINE SCREEN

The invention relates to a filter bag for a filter element of a disc-like filter formed by a plurality of filter elements, comprising filter surfaces of a flexible material permeable to liquid, the filter surfaces being arranged to be positioned against both sides of the element when the filter bag is in position; and a closable opening at one edge of the bag, through which opening the filter element is arranged to be inserted into the filter bag.

Filters in machine screens are formed by substantially triangular filter elements which are inserted into separate filter bags. The filter bag is formed by a filter network or cloth to be positioned on both sides of the element and joined to form a baglike filter. One edge of the filter bag is provided with an opening through which the filter element is passed in place. The opening can be closed either by a zipper or some other closing means after the filter element has been inserted into the bag.

To ensure that the filter bag is accurately of the right size and fits sufficiently tightly around the filter element, it is made of a material which shrinks in the direction of the surface of the filter cloth when it is heated. The desired tightness is achieved by heating the filter bag after it has been put in place and the open edge has been closed. After the bag has been closed and tightened, the size of its filtering surface is adjusted to the filter by blocking filter cloth at the edges of the filter element on its both sides with paint or some other suitable material.

One problem with the use of filter bags is that the filter bag has to be made of a material which shrinks when exposed to heat. Another problem is that each time the filter bag is put in place it has to be adjusted to the filter by covering part of the filter surface in order to achieve favourable conditions for the filter and the material to be filtered.

The object of the present invention is to provide a filter bag which avoids the problems mentioned above. This is achieved according to the invention in such a manner that the filter surfaces of the filter bag are formed by separate filter parts, and that a separate edge part is attached to the edges of the filter parts, the edge part being made of a material which shrinks at elevated temperature and is less permeable to liquid than the filter part.

The basic idea of the invention is that both sides of the filter bag comprise a filter surface consisting of a conventional wire fabric or network of a shape and size suitable for the operation of the filter in question. The filter bag is formed by fastening to the edges of the filter parts an edge part of a material that shrinks at elevated temperature and that is considerably less impermeable to liquid or substantially less impermeable than the filter parts. After the bag has been put in place, the edge part is shrunk so that the wire part possibly made of an unshrinkable material is tightened around the filter element.

Figure 2:
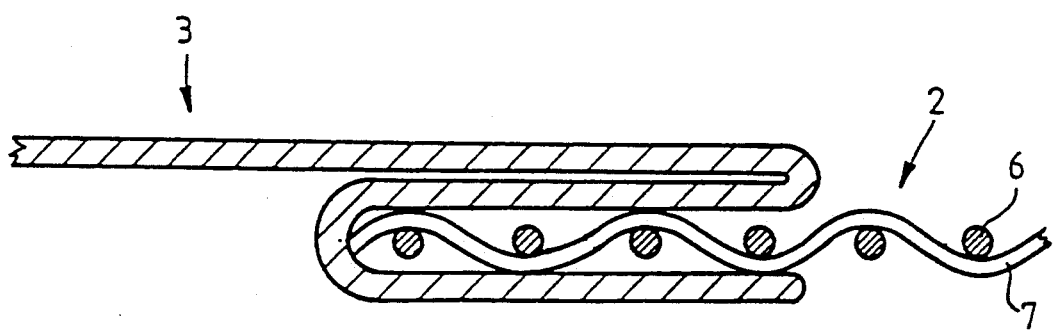
Figure 3:
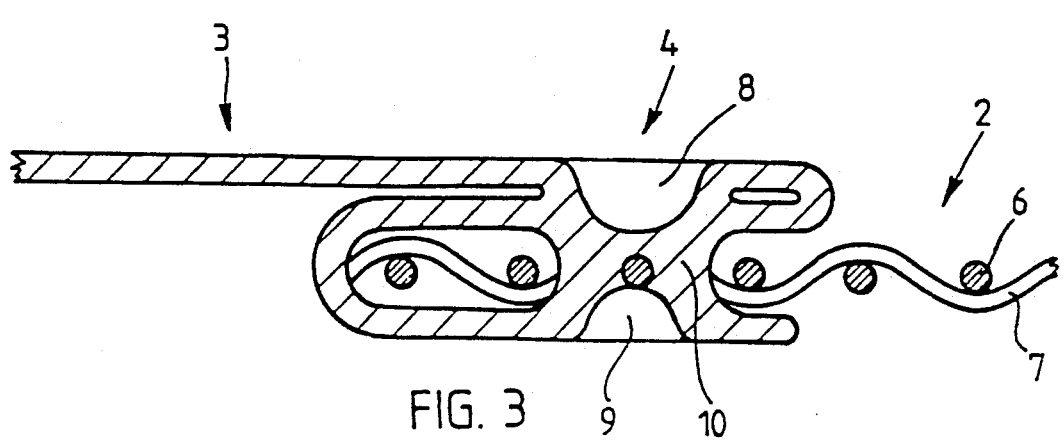

The invention will be described in greater detail in the attached drawings, wherein FIG. 1 is a schematic view of a filter bag of the invention; and FIGS. 2 and 3 are schematic cross-sectional views of one embodiment of the filter bag of the invention.

FIG. 1 shows a filter bag 1 having the shape of a sector of a circle and comprising a filter part 2 and an edge part 3. The figure also shows a joint 4 between the filter part 2 and the edge part 3. The filter part 2, which is made of a filter network or wire of plastic or metal, is cut into a suitable shape and size for the filter in question. The filter network may be of a material which shrinks at elevated temperature or of a material the dimensions of which do not vary with temperature.

The edge part 3, made of a material that shrinks at elevated temperature, is then attached to the edges of each filter part 2 to surround it. The edge part can be an integral piece extending from the edge of one filter part to the opposite side of the filter bag to the edge of the other filter part. Alternatively, the edge part 3 can be made by first fastening an edge part to the edge of each filter part 2, whereafter the edges of the edge parts are joined by a seam 5, for instance. An opening is left in one edge of the filter bag 1 so obtained, through which opening a sector-shaped filter element is inserted into the filter bag, whereafter the opening is closed by any closing means known per se, such as a zipper, hooks or a seam. After the opening has been closed, the edge part 3 is heated so that it shrinks, thus tightening the filter parts 2 closely around the filter element.

FIGS. 2 and 3 show a cross-sectional view of one embodiment of the filter bag of the invention. In FIG. 2, the edge part 3 is folded around the edge of the filter part 2 in such a manner that it forms a groove into which the edge of the filter part 2 extends. The filter part 2 and the edge part 3 can then be joined either by stitching them together so that the thread or the like goes through at least one edge part layer on both sides of the filter part. Alternatively, when the edge part is of a weldable material, the folds of the edge part can be welded together through the filter part by ultrasound or some other suitable technique, as shown in FIG. 3.

An advantage of the filter bag of the invention is that the filter part can be made of a material best suited for the purpose in each particular case without having to take into account its other properties. Another advantage is that the filter bag can in all cases be put in place easily and simply. Still another advantage is that the filtering area of the filter bag of the invention can be dimensioned in advance for each filter and no separate covering is required to achieve the desired filtering properties.

The invention has been described above by way of example, and it is in no way restricted to this example. The filter element need not necessarily be sector-shaped but any shapes conventional in the art can be used. The edge part can be of a material completely impermeable to liquid or air or of a material which may be extremely densely woven or partly contain holes, provided that its permeability is substantially insignificant as compared with that of the filter part. The edge part may be fastened to the filter part as described above or the edges of the edge part and the filter part can be simply overlapped and then joined by sewing or in some other way.

We claim:

1. A filter bag for a filter element of a disc-like filter formed by a plurality of filter elements, comprising:
    two filter surfaces of a flexible material permeable to liquid, the two filter surfaces being arranged to be positioned one against each side of the filter element when the filter element is inserted into the filter bag and a closable opening at one edge of the filter bag, through which opening the filter element is arranged to be inserted into the filter bag, wherein the two filter surfaces of the filter bag are formed as separate filter parts having edges; and a separate edge part being attached to the edges of the filter parts to connect the two filter parts to each other at the edges, sealing at least some of said edges of said filter parts, the separate edge part being made of a material which shrinks to a greater extent at elevated temperatures than said filter parts and said separate edge part being less permeable to liquid than said filter parts.

2. A filter bag according to claim 1, wherein the separate edge part is substantially impermeable to liquid.

3. A filter bag according to claim 2, wherein the filter parts are substantially of the same size as a surface of a filter element to be inserted into said filter bag.

4. A filter bag according to claim 3, wherein the filter parts are made of metal networks.

5. A filter bag according to claim 3, wherein the filter parts are made of plastic networks.

6. A filter bag according to claim 3, wherein the separate edge part is fastened to the filter part by a sewn seam.

7. A filter bag according to claim 3, wherein the separate edge part is fastened to the filter parts by a weld.

8. A filter bag according to claim 6, wherein the separate edge part is folded around the edge of at least one filter part on both sides of said edge of said filter part, said separate edge part being fastened to said at least one filter part through at least one said separate edge part layer on both sides of said edge of said filter part.

9. A filter bag according to claim 7, characterized in that the edge is folded around the edge of the filter on its both sides before being fastened and that it is fastened to the filter through at least one edge part layer on both sides of the edge of the filter.

10. A filter bag according to claim 3, wherein said separate edge part comprises two separate edge portions, each bonded to a respective separate filter surface, said separate edge portions being bonded to each other along an outer periphery of both said separate edge portions.

11. A filter bag according to claim 3, wherein said separate edge part comprises a single integral piece, said single integral piece being bonded to a first filter surface formed around the outer edges of said first filter surface and extending from the outer edge of said first filter surface to the outer edge of a second filter surface, surrounding said outer edge of said second filter surface and being bonded to said outer edge of said second filter surface.

* * * * *